United States Patent [19]

Woods et al.

[11] 4,320,455
[45] Mar. 16, 1982

[54] QUEUE STRUCTURE FOR A DATA PROCESSING SYSTEM

[75] Inventors: William E. Woods, Natick; Philip E. Stanley, Westboro; Thomas S. Hirsch, Bedford, all of Mass.

[73] Assignee: Honeywell Information Systems Inc., Waltham, Mass.

[21] Appl. No.: 100,028

[22] Filed: Dec. 3, 1979

Related U.S. Application Data

[63] Continuation of Ser. No. 868,146, Jan. 9, 1978, abandoned.

[51] Int. Cl.³ .............................................. G06F 9/36
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,970,999 | 7/1976 | Elward | 364/200 |
| 4,038,645 | 7/1977 | Birney et al. | 364/200 |
| 4,047,247 | 9/1977 | Stanley et al. | 364/200 |
| 4,054,945 | 10/1977 | Ichiko et al. | 364/200 |
| 4,074,353 | 2/1978 | Woods et al. | 364/200 |
| 4,104,721 | 8/1978 | Markstein et al. | 364/200 |
| 4,139,893 | 2/1979 | Poland | 364/200 |

Primary Examiner—Garteh D. Shaw
Assistant Examiner—C. T. Bartz
Attorney, Agent, or Firm—John S. Solakian; Nicholas Prasinos

[57] ABSTRACT

One or more queue structures in a data processing system may include a threaded list of frames which are enqueued or dequeued from the list in accordance with four instructions wherein each list is tied to a so-called lock or control frame with synchronization for multiple processing units. Multiple lock frames and accordingly multiple lists of frames may be coupled in the system for the purpose of accomplishing the various tasks necessary.

10 Claims, 17 Drawing Figures

QUEUE STRUCTURE FOR A DATA PROCESSING SYSTEM

This is a continuation of application Ser. No. 868,146, filed Jan. 9, 1978, now abandoned.

BACKGROUND OF THE INVENTION

The present invention relates to data processing systems and more particularly to queue structures which may be utilized in such systems.

Queue structures are used primarily for the management of data structures, without the necessity for moving bulk information around in data processing systems, by use of a pointer or header. The queue is used to schedule tasks which are performed on a priority basis. This is done dynamically during processing. Processing is conducted within a task being performed rather than scheduling such processing. Queues are also used in communication buffers for queuing calls. The structures of the present invention may be managed on a last-in, first-out (LIFO) or on a first-in, first-out (FIFO) basis. Queues may also be utilized to maintain a list of free working memory ordered by size or by address. The order of removal of the queues is independent of the order of insertion. In the prior art, it has been known to utilize what has been called an associative memory in order to accommodate the queuing structures. This associative memory technique although theoretically appealing is in actual practice unsuited to handle such queuing tasks due to the relatively high cost and slow access time. In the prior art, as taught in the U.S. Pat. No. 3,449,722, issued June 10, 1969, a new and improved queuing scheme for multiprocessing systems was described in which program requests which cannot be immediately operated on are temporarily stored so that upon the freeing of an originally busy processor section, the oldest queued program request for the particular processor section would be accommodated. Such United States patent suggested the use of a common queue for each such section in the system which could be separately accessed, thereby, by use of the common queue, having established a capability of a string of requests relative to each of the processor sections comprising the data processing system, and thereby avoiding undue expenditure for hardware which is required by such queues. In such queuing structures in data processing systems it is, however, important to provide such queuing structure in a manner such that the queue or frames which are inserted in a list of such queues or frames may be accessed, i.e., enqueued or dequeued, in any manner dependent or independent of the priority of the tasks or subtasks identified by such queues.

It is accordingly a primary object of the present invention to provide an improved queue structure for use in a data processing system by which the queue structure may be accessed for enqueuing or dequeuing based on the priority of the frames in such queue structure or independent of the priority of such frames, or based on the address of such frames.

SUMMARY OF THE INVENTION

The above stated object and other objects are achieved according to the present invention by providing a data processing system which includes a queue structure which comprises at least one list (which may be empty) of priority frames coupled with a common control frame, the priority frame including a location for a priority number, a location for a first pointer to another one of the priority frames and one or more locations for including further information associated with such priority frames. The control frame includes a location for a control word which allows or disallows access to the list of priority frames, and, includes a first frame pointer for pointing to the first one of the priority frames and a last frame pointer for pointing to the last one of the priority frames in such list. Each of the priority frames may have different priorities associated therewith as indicated by the priority number. The queue structure further comprises apparatus for coupling the priority frames together. The queue structure also comprises apparatus for placing new ones of such priority frames in such list in a position determined by the priority number, and further logic is provided for retrieving one of such priority frames from such list in accordance with or independent of the priority number.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT

Figure 3:
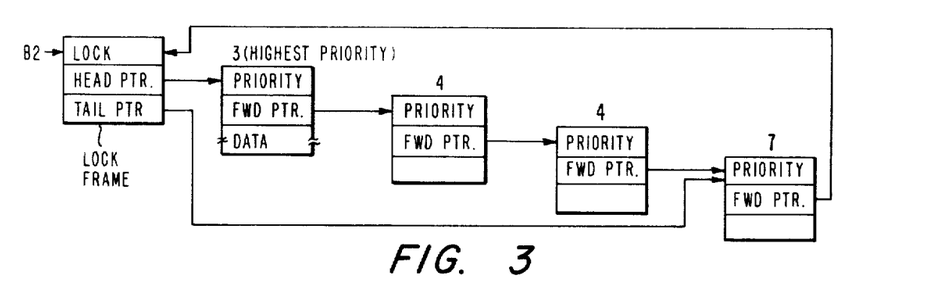
FIGS. 3 through 13 illustrate the manner in which the queue structure of the present invention may have frames queued or dequeued.

In the queue management system of the present invention, a queue capability is provided that facilitates handling of ordered lists of frames. A frame may include a frame priority number, a next frame pointer, and an associated data structure. Each list is identified by a lock frame which contains a lock word and, in addition, a head pointer and a tail pointer. This is shown in FIG. 3. Only one lock frame and associated list of frames is shown in FIG. 3, however, it should be understood that more than one lock frame and associated lists of frames may be included in the system. Each threaded list may be associated with a particular task or a number of tasks, thus, these parallel queue structures, each headed by a lock frame, may be for different tasks or the same task, or for different operations. The queue structure is built for a particular purpose, and when the data processing system indicates that it desires a certain queue, it is usually ready to deal with it, i.e., to operate on the data structure associated therewith. If the system desires to address a different threaded list, then it merely changes the address in a particular one of the registers in the system to point to a new lock frame. The composition of the data structure is not relevant to the present invention, however, it may include data which has been stored away during an operation included in a task, or, in fact, the data structure may be nothing more than another pointer to another location where the actual data is being stored.

There are basically four instructions included in the queue system, two for enqueuing, i.e., placing a frame in the list, and two for dequeuing, i.e., taking a frame from the list. They will be described hereinafter. The lock word is used to insure that only one data processing unit is accessing a particular queue as indicated by a particular lock frame at any given time. Each queue instruction will cause a scan of the frame from the head toward the tail of the list. There is one exception which shall be hereinafter described.

The scan operation will continue until the conditions of the particular command are met by a so-called hit, or until the last frame in the list is reached without a hit, or until an interrupt occurs in the system. When the so-called hit occurs, or if the last frame is reached without a hit, the frame is linked into or out of the list, as appropriate, depending upon whether it is an enqueue or dequeue instruction. If an interrupt occurs, the central processing unit will stop the scan and operate on the interrupt condition.

As previously mentioned there are four basic instructions in the queue system of the present invention. They are the queue-on-head instruction (QOH), queue-on-tail instruction (QOT), the dequeue-on-head instruction (DQH) and the dequeue-on-address instruction (DQA). The QOH instruction is used to link a new frame into the list before the first frame that has the same priority number, or before the first frame that has a numerically higher priority number, or as the last frame if no equal or greater priority is found. The QOT instruction links a new frame into the list after the last frame that has the same priority number, or before the first frame that has a numerically higher priority number, or as the last frame if no equal or greater priority is found. If the new frame has the lowest priority that can be given in the system, then the scan operation is bypassed and the new frame is linked after the last frame. The DQH instruction is used to unlink the first frame from the list whose priority value equals or is numerically greater than a priority value indicated by the system. This value is indicated in a specific register as shall be hereinafter described. The DQA instruction unlinks a frame whose priority word address exactly matches an address indicated in the system. This address is indicated in a specific register as shall be described hereinafter.

The operation of the queue structure including the linking and unlinking operation, and including a flow chart illustrating such operation, shall be discussed hereinafter. At this point, the data processing unit architecture in which the queue system of the invention operates shall be discussed.

Figure 1:
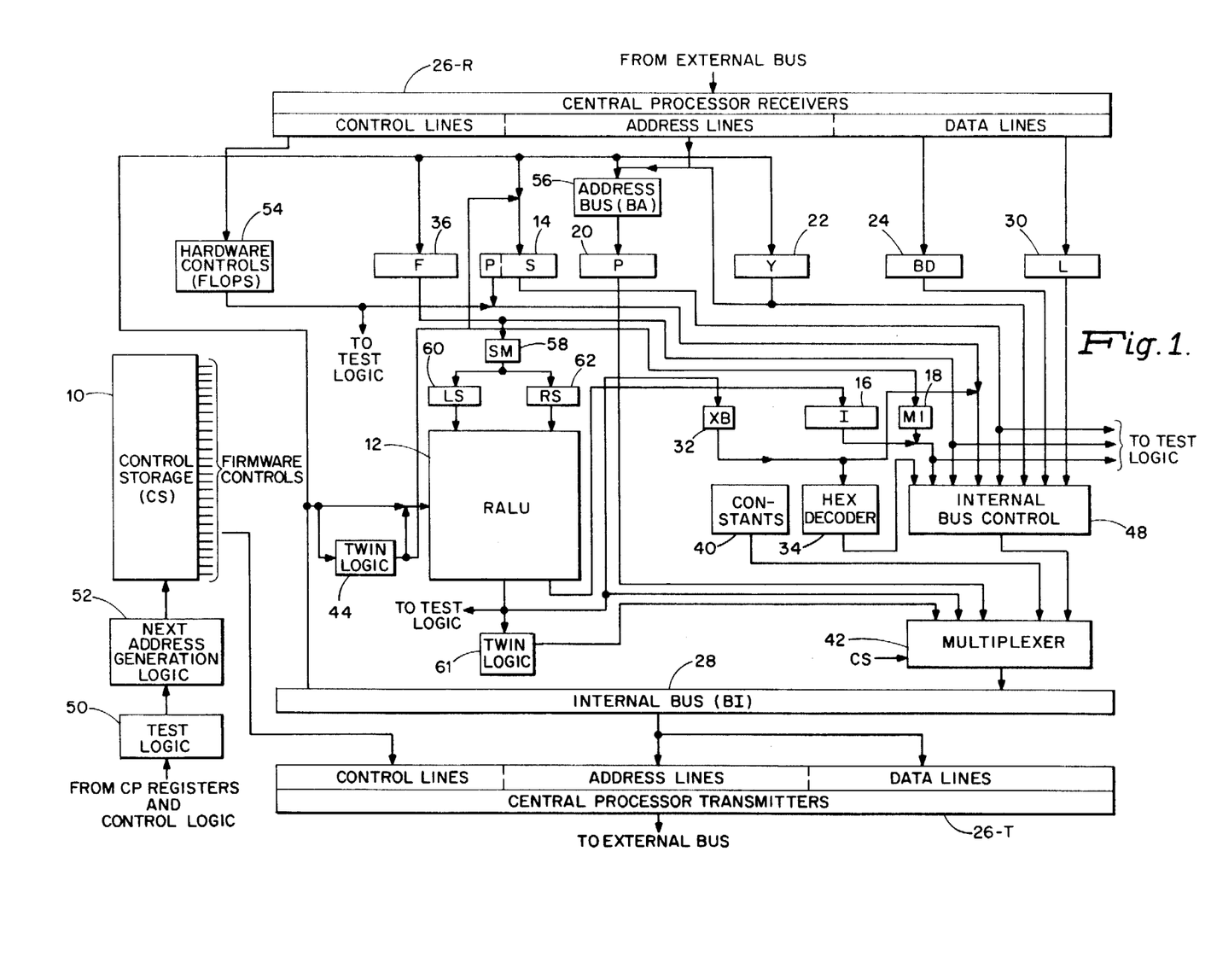
FIG. 1 is a block diagram of a data processing system utilized in conjunction with the queue structure of the present invention.

A block diagram of the data processing system used in the queue system of the present invention is shown in FIG. 1. Further details of such data processing system may be found in U.S. Pat. No. 4,047,247, issued Sept. 6, 1977. The system includes a control store 10 which includes by way of example 512 locations, each location including 56 bits. Each such location is capable of storing a firmware word, such firmware words being used to control various hardware operations within the data processor. It is understood that the number of such locations and/or firmware words and the number of bits in such words may be increased or decreased. Operation of a control store and the instruction decoding thereof is shown in the article entitled, "Designing Optimized Microprogrammed Control Sections for Microprocessors", by G. W. Schultz, appearing at page 119 of the April, 1974 issue of Computer Design magazine.

Figure 2:
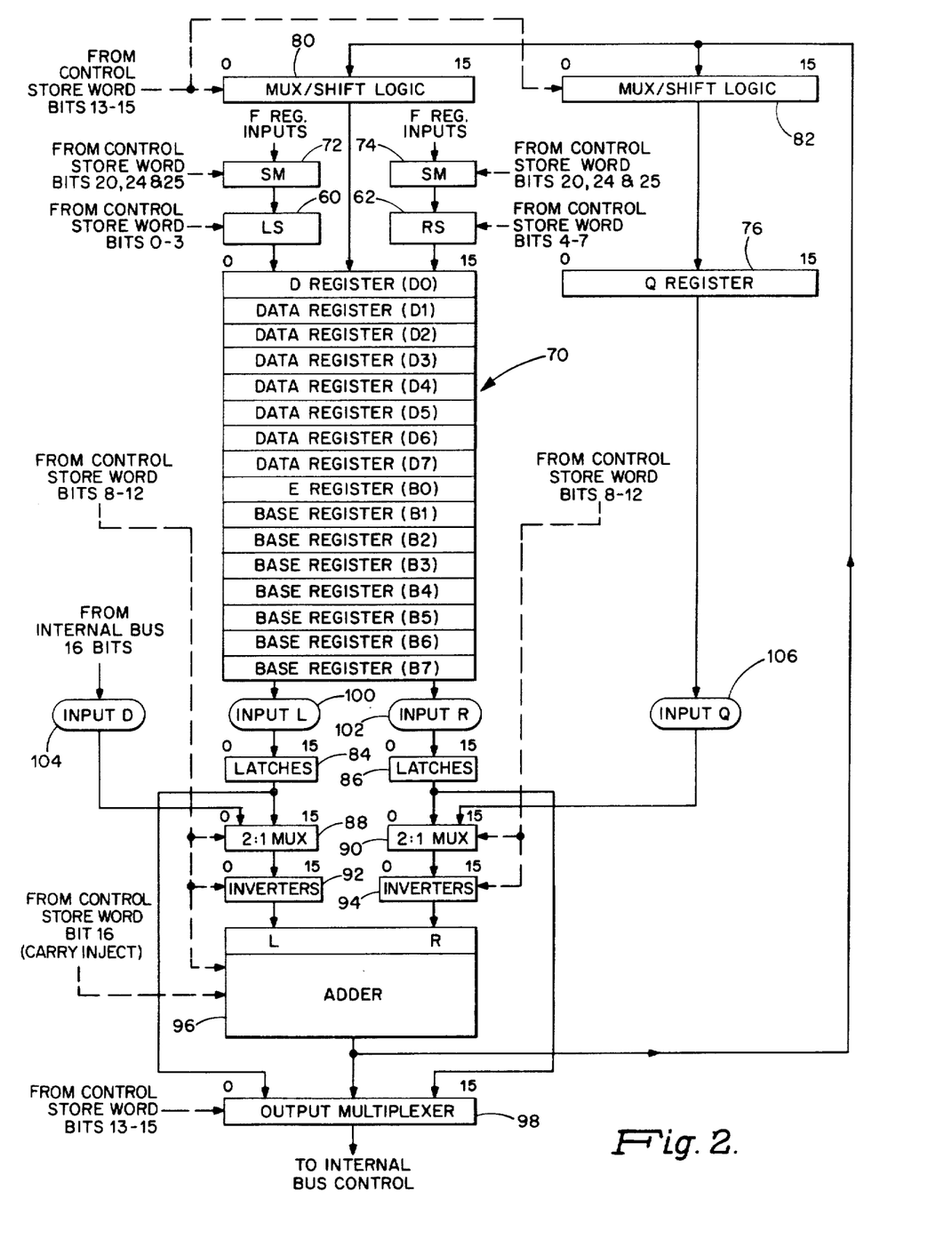
FIG. 2 is a detailed block diagram of the microprocessor which is used in the data processing system of the present invention.

Also included in the data processor is a register and logic unit (RALU) 12 which is sometimes referred to as the microprocessor. FIG. 2 is a block diagram of the RALU 12 illustrating the details thereof. In general, the RALU is divided into four areas which include a register file, shift logic, arithmetic logic, and control logic. The register file includes data registers, working registers and base registers. The shift logic is used during shift operations and normal transfers of data. The arithmetic logic includes various latches or buffers, multiplexers, inverters and an adder unit. The control logic of the RALU includes selector logic for selecting that portion of data to be operated upon.

The central processor includes various registers some of which are not essential to the present invention, but which will be generally discussed for background purposes. The status/security register 14 contains the system status and security keys. This register includes bit fields which indicate whether the system is in the privileged state (P) or whether it is in the user state. During the user state, specified instructions will enter a so-called trap routine instead of being executed. The register 14 also includes a field for indicating the I.D. number of the processor, and is set during system configuration. The register 14 also includes a field for indicating the interrupt priority level of the central processor. The current running program in the central processor can be interrupted by any device which requests a level number which is lower than the level number of the running program, wherein the lowest level number indicates a process and/or device which is least interruptable. Such interrupt structure is shown in U.S. Pat. No. 4,020,471, issued Apr. 26, 1977.

The indicator register (I) 16 contains the program status indicators. This register 16 includes various fields among which are included fields for indicating the results of any comparison which was made in the system, and indication or status of the last peripheral device which was interrogated, and a field to indicate the state of the last bit tested.

The M1 register 18 contains trap enable mode control keys, which include a field for enabling a trace trap (i.e., a trap which assists in tracing a computer program's operation) for jump and branch instructions.

The program counter (P register) 20 is by way of example a 16 bit register which normally contains the address of the instruction currently being executed. The Y register 22, i.e., the memory address register, is also by way of example a 16 bit register that normally contains the address of data to be accessed in memory. The bus data register (BD) 24 is also by way of example a 16 bit register that receives bus data from the receiver logic 26-R for distribution throughout the processor via the internal bus 28. The interrupt register (L) 30 is also by way of example a 16 bit register that receives a channel number and level of an interrupting device via the receiver logic 26-R.

The XB register 32 is by way of example a four bit register that is used for bit and byte indexing within the processor. The output of this register 32 is coupled to both the internal bus 28 and the decoder logic 34. The instruction register (F) 36 is by way of example a 16 bit register that holds the instruction word as it is received from a memory which may be coupled to the external bus.

The constant generator logic 40 is coupled to provide specific constants to the multiplexer 42 for use in association with the processor's firmware included within control store 10. Decoder logic 34 includes a four to 16 bit multiplexer that is used to generate a mask for bit operations. That is, one out of 16 bits is selected for testing for use by the firmware included in control store 10. The input twin logic 44 provides the capability of either duplicating the most significant (left hand) character (byte) or performing a straight through transfer from the internal bus 28 to the RALU 12. Output twin logic 61 provides similar capabilities.

The internal bus control logic 48, as specified by the firmware word in control store 10, gates the contents of selected processor registers onto the internal bus 28 via the tri-state logic 42. Multiplexer logic 42 includes the logic by which data is transmitted to the internal bus 28, with only one input enabled for transfer at any given time.

Test logic 50 selects by way of example one of 64 possible test conditions, as specified by the firmware word. Depending upon whether the tested condition is true or false, the signal (TSTRUE or $\overline{\text{TSTRUE}}$) is transmitted to the next address generation logic 52. The processor utilizes one of two methods to generate the next firmware address. The first method uses bits of the control store word to form the next address. These bits may for example comprise a 10 bit address field (next address, NA) that can directly address one of potentially 1,024 control store locations. The second method obtains the next address from logic circuitry that contains several preassigned addresses. The address selected is determined basically by a decode of the F register 36 contents and the control store 10 outputs.

The internal bus (BI) 28 is by way of example 16 bits wide and is primarily used to transfer data among the processor's registers. Memory addresses and data are also transferred to the external bus via the internal bus 28. The address bus 56 is by way of example 16 bits wide and is used to transfer the addresses for the input and output and memory read or write cycles to the logic 26-T. The transceiver logic 26 (26R and 26T) includes logic circuitry which is the only interface between the central processor and the external bus. All data, address and interrupt signals must pass through the transceiver logic 26. Such transceiver logic 26 as well as the operation of the external bus is described in U.S. Pat. No. 4,030,075, issued June 14, 1977.

The select modifier logic (SM) 58 determines which bits of the F register 36 (if any) are used to modify the register file selection performed by the LS and RS fields, i.e., the left select and right select fields of the control store word of control store 10. The SM logic 58 gates F register bits 1 through 3, 10 through 11, 13 through 15, or 12 through 15, depending upon the firmware word, to both the left and right selector logic, i.e., LS logic 60 and RS logic 62. The LS and RS logic use the selector modifier 58 output and the contents of the firmware word for register selection.

The external bus provides a common communication path or interface among all units, including memory, of the system. The external bus is asynchronous in design and units of varying speed are operated efficiently on the system with three types of communication permitted, namely, memory transfers, input/output transfers, and interrupts. The external bus may have coupled thereto, the central processor, a memory unit, peripheral device controllers, communications controllers and the like. The above noted registers, etc., are further described in a Honeywell Information Systems Inc. publication dated January, 1976, entitled, "Honeywell Level 6 Minicomputer Handbook", order number AS22.

Now referring to FIG. 2, the register and logic unit (RALU) 12 is illustrated in detail. RALU 12 may comprise four Model 6701 Microcontrollers manufactured by Monolithic Memories Inc. and described in their publication therefor dated August, 1974. As indicated hereinbefore, the RALU 12 is divided into four basic areas, more particularly a register file, shift logic, arithmetic logic, and control logic. First referring to the register file 70, it includes the data registers D1 through D7, the working registers DO (or D) and E, and base registers B1 through B7. Registers D1 through D7 are by way of example 16 bit word operand registers, with bit zero being considered the most significant bit. Registers D and E are also by way of example 16 bit registers and are used for manipulating data during firmware operations, the register D is sometimes used to hold a copy of the contents of the instruction register (F)36. The base registers are also by way of example 16 bit address registers that can be used for formulating addresses by pointing to any procedure, data or arbitrary location in the system.

Multiplexer shift logic 80 and 82 primarily include two 16 bit multiplexers that are used for both shift operations and normal transfers of data. An additional 16 bit register (Q) 76 is provided for double operand shifts. Data can be shifted left or right by one bit between the multiplexers and any data register within the register file 70. The Q register 76 sometimes contains an unindexed address and the E register (B0) contains an index value.

The arithmetic logic is comprised of two 16 bit latch circuits 84 and 86, two two-to-one multiplexers 88 and 90, two 16 bit inverters 92 and 94, adder unit 96 and an output multiplexer 98. The latches associated with input L 100 receive data from the register file 70 as selected by the left selector logic 60. Similarly, the latches associated within input R 102 receive data from the register file 70 as selected by the right selector logic 62. Outputs from these latches feed both the two-to-one multiplexers 88 and 90 respectively and the output multiplexer 98. The left-hand multiplexer 88 receives data from the internal bus 28 via input D104 and the latches 84 asociated with input L 100. The right-hand multiplexer 90 receives data from the Q register 76 via input Q106 and the latches 86 associated with input R 102. The outputs from these multiplexers are fed through inverters 92 and 94 respectively to the respective L and R inputs of the adder unit 96. The adder unit 96 provides all arithmetic and logical operations. In addition to the L and R inputs, an additional input is provided from control store word bit 16 (carry inject). The adder 96 output is fed to both the output multiplexer 98 and the input multiplexers/shift logic 80 and 82. The output multiplexer 98 is the main output from the RALU 12. Data from the output multiplexer 98 is provided to the internal bus 28 for distribution throughout the processor.

The following is a further discussion with respect to the processor and operation that is depicted in FIGS. 1 and 2. The central processor is organized around a single internal bus 28 which connects most of the processor elements to each other and to the external bus via receivers 26-R and transmitters 26-T. As indicated hereinbefore, the Y register 22 is the memory address register and the F register 36 is utilized to receive an instruction word during instruction fetches. Various bits on the internal bus 28 are used as inputs to the test logic 50 for use in making firmware branching decisions. The information contained in such various bits from the internal bus 28 can be stored in the test logic 50 and any one of various hardware control flip-flops 54. The internal bus 28 is also an input to the RALU 12.

The internal bus 28 is driven or controlled by several elements including the constant generator 40 which operates under firmware control, the RALU 12, and the byte selection register (XB) 32 which is loaded by a shifting from the RALU 12.

The current microinstruction is dynamically available at the output of the control store 10, is partially decoded with various logical elements and is then used to provide operations with respect to the remaining elements in the system. The next address generator logic 52 utilizes the next address field in the control store word, i.e., the firmware word, and generates a new address dependent thereon and dependent upon test conditions provided by test logic 50. The control store 10 advances to the next address once per processor clock cycle which may be in the order of a few hundred nanoseconds.

Having described the architecture of the data processing system in which the queue system of the present invention may be used, the functional operation of such queue system will now be discussed following which a detailed flow diagram of the queue system of the present invention will be discussed.

By the present invention, the queue frames are arranged in an ordered priority list in increasing order. The threaded list of frames is arranged as shown in FIG. 3 with the first frame, called the lock frame, including a lock, a heat pointer (or a first frame pointer) and a tail pointer (or a last frame pointer). Each of the frames, of which four are shown by way of example, has a given priority of which priority "3", two "4" priorities and a priority 7 are shown. The head pointer points to the frame having priority 3, 3 to 4, 4 to 4, and 4 to 7, with the priority 7 frame pointing back to the lock frame. The tail pointer of the lock frame points to the priority 7 frame, i.e., the last or tail frame. Thus, as can be seen, there may be frames included which have the same priority.

If a new priority frame is to be added to the queue and if such frame has a priority of 4, this 4 priority frame is inserted either before the two 4 priority frames or after, but not in between. If it is a new priority number which is to be inserted, such as five, then it would be inserted between the last (closest to the tail of the queue structure) 4 priority and the 7 priority frame. The frames are only removed from the head side, i.e., closest to the lock frame, so therefore if a frame having priority 4 is requested from the threaded list of queues then the priority 4 frame closest to the lock frame is taken.

Figure 4:
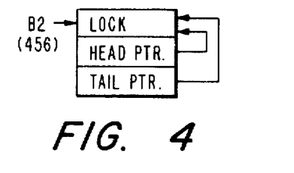

There are four instructions which are provided in order to either enqueue or dequeue frames to and from the list respectively. They are queue-on-head (QOH), queue-on-tail (QOT), dequeue-from-head (DQH), and dequeue-by-address (DQA). The queues are presumed to be stored in main memory. By way of explanation, and as shown in FIG. 4, if there are no frames associated with a particular lock frame, then the head pointer and tail pointer both point back to the lock word of the same lock frame. The base register B2, which is located in the commercially available microprocessor chip as shown in FIG. 2, is shown pointing to the lock frame.

Figure 5:
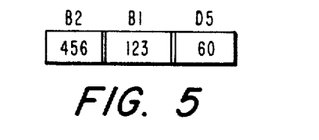

As shown in FIG. 5, by way of example, the address utilized is indicated to be address 456. In addition to register B2, which has address 456 stored therein, register B1, also in the microprocessor chip, includes the number address of the frame to be inserted, which is here shown to be 123. The D5 register, also in the microprocessor chip, is used as a priority register, here shown to have a priority of 60 stored therein.

Figure 6:
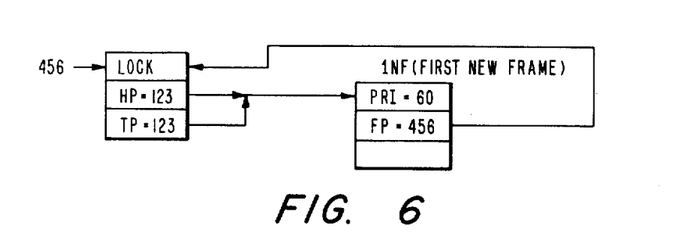

Now with reference to the queue-on-head instruction, the operation thereof is as follows. The firmware on execution of QOH breaks the connections shown for the lock fram without additional frames, as shown in FIG. 4. Successively thereafter, the number 123 is stored in the head pointer location, as well as in the tail pointer location of the lock frame. The number 456 is stored in the forward pointer location of the new frame and the priority value 60 is stored in the priority location also of the new frame so that the lock frame and new frame are now shown coupled as shown in FIG. 6.

Figure 7:
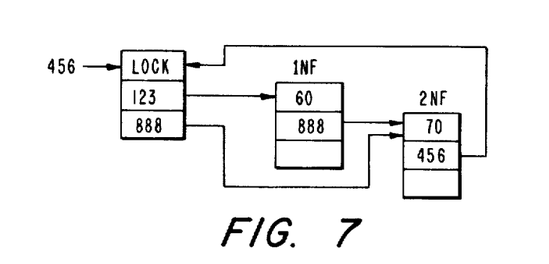

In further discussion of the operation of the QOH instruction, assume that at a later time, the system assigns the priority number of a second frame to be inserted in the queue structure, to 70, B1 (the address of the new frame) to 888, and assume B2 remains at 456, which is the address of the lock frame, at which time another QOH instruction is executed. Based on this, the queue structure looks as shown in FIG. 7. Thus, as can be seen, since the priority equals 70, this is added after the first new frame which has a priority of 60. As can also be seen, the head pointer in the lock frame remains pointing to the first new frame, however, the tail pointer of the lock frame now points to the second new frame. In addition, the forward pointer in the first new frame now points to address 888, the address of the second new frame.

Figure 8:
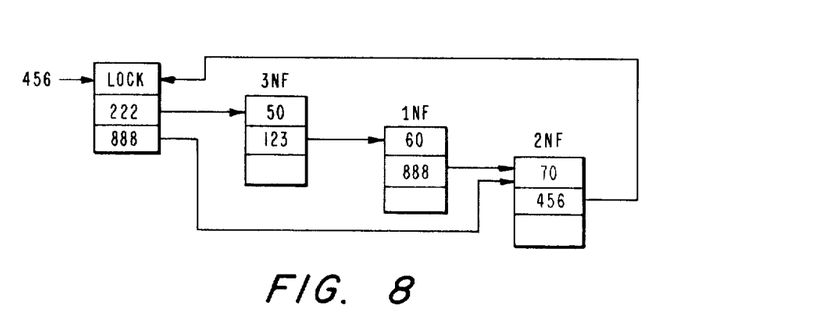

By way of further example, assume that another QOH instruction is executed. This time the priority number in register D5 is equal to 50 with the address of the third new frame, as indicated in register B1, set to be 222, with B2 still having address 456. After execution of this QOH, the lock frame and the three new frames are coupled as shown in FIG. 8. As will be noted from FIG. 8, the third new frame is coupled between the lock frame and the frame previously inserted with a priority of 60.

Figure 9:
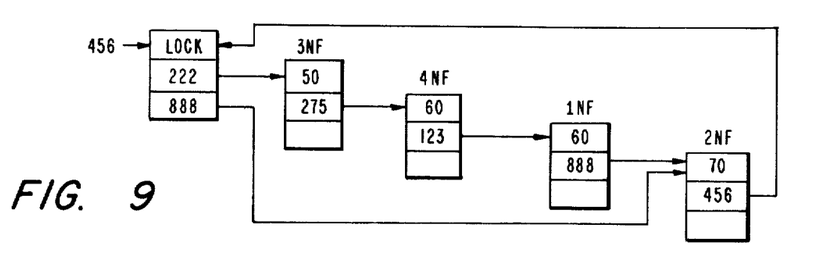

Now with reference to FIG. 9, assume another QOH instruction is executed, this time with another frame having a priority of 60, whose address is 275, to be inserted in the queue structure. In this case, since it is a QOH instruction, this frame will be inserted before the frame with a priority of 60 which was previously inserted. Accordingly, the queue structure will be changed from FIG. 8 to that shown in FIG. 9, so that the third new frame has its pointer changed to point to the fourth new frame, with the fourth new frame pointing to the first new frame. Otherwise, the queue structure of FIG. 9 resembles that of FIG. 8.

Figure 10:
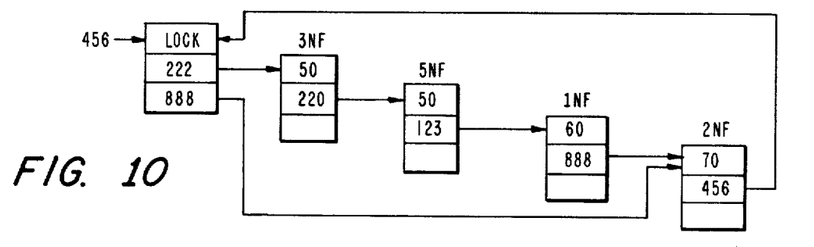

The above sequence of operations described the manner in which the queue structure is built up by use of successive QOH instructions. The following will describe two QOT instructions, assuming a base structure existing as shown in FIG. 8, and assuming a QOT instruction for inserting a frame having a priority of 50 with an address of 220 as indicated in register B1, and still assuming that register B2 points to the same lock frame with the address 456. Accordingly, the fifth new frame having such priority of 50 will be inserted after the already existing frame having a priority of 50 previously referenced as the third new frame. In such case, the third new frame will have its pointer changed to point to the fifth new frame by replacing the address 123 with the address 220, and the fifth new frame pointer will point by address 123 to the first new frame, it being again noted that the fourth new frame referenced in FIG. 9 is not shown in FIG. 10 for purpose of ease of illustration only. Thus, in this case, for QOT instruction, the new frame is inserted after the existing frame having the same priority number, whereas in FIG. 9, with the QOH instruction, the new frame having the priority number 60 was inserted before the existing frame having the same priority, that is, the new frame was inserted closer to the lock frame in that case (the QOH instruction).

Figure 11:
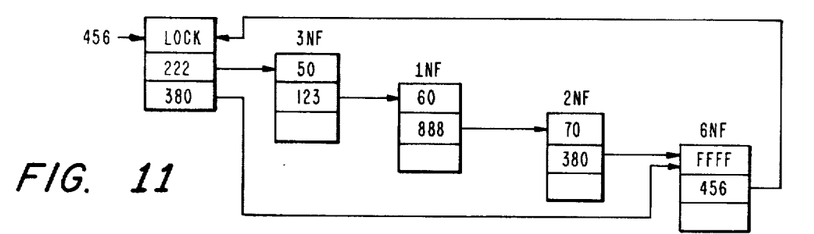

Now with reference to FIG. 11, there is a special case in which the QOT instruction may be used where the priority of the frame does not matter. That is, there is a situation which may allow a savings in time in setting up the queue structure, where, in fact, the priority of the new frame does not matter. This instruction is referred to as a QOT instruction having a priority with the highest number, in this case referred to as priority number FFFF (hexidecimal). In this case, such priority is placed at the end of the queue list, after the second new frame in this example, which requires therefore that the pointer of the second new frame point to this sixth new frame with the pointer in such sixth new frame pointing back to the lock word in the lock frame. In addition, the lock frame tail pointer will be changed to point to the sixth new frame, which, in this case, has an address indicated to be 380.

Figure 12:
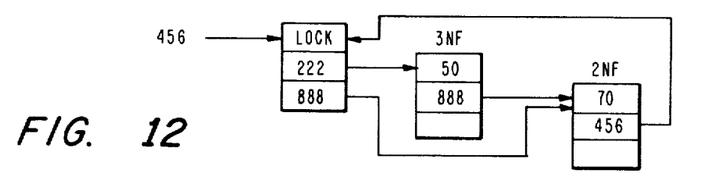

In addition to the QOH and QOT instruction, there are dequeue instructions, and, more particularly, the DQH instruction and the DQA instruction. FIG. 12 illustrates an example of the DQH instruction wherein a frame is to be removed. In this case, by way of example, and with a reference to FIG. 8 as an existing structure at the time the DQH instruction is received, the DQH instruction indicates that it wants to remove from the queue list a frame whose priority number is 55 or greater, as indicated in register D5. In such case, therefore, the first frame having a priority equal to or greater than 55 is the first new frame, having a priority of 60. In such case, such frame is removed, the remaining frames, i.e., the third new frame is coupled to point to the second new frame, with the tail pointer of the lock frame, as well as the first frame pointer of the lock frame, remaining the same.

Figure 13:
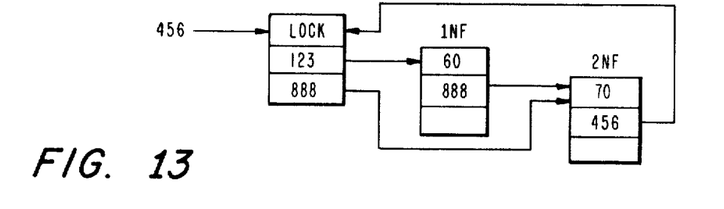

With reference to the DQA instruction, assume that the DQA instruction desires to remove from the queue structure a frame whose address is 222, as indicated in base register B1. In such case, therefore, and with reference to FIG. 8, it is the third new frame which will be removed, which, in this case, had a priority of 50, but as explained, this priority does not have any influence on the DQA instruction. Thus, upon removing the third new frame whose address is 222, the queue structure remains as shown in FIG. 13, with the first new frame and the second new frame only, with the only change in the lock frame being that the first frame pointer is changed to point to the first new frame rather than the third new frame which has been removed. The first new frame remains pointing to the second new frame, which in turn points back to the lock frame.

Now referring to FIGS. 14A and 14B, the operation of the queue system of the present invention will be discussed in further detail by use of flow diagrams. Such flow diagrams depict the operation of the data processing system of FIG. 1, and, more particularly, the manner in which the control store words or firmware words are organized and implemented in order to provide the enqueue and dequeue operations in accordance with the four instructions of the queue system of the present invention.

Figure 14A:
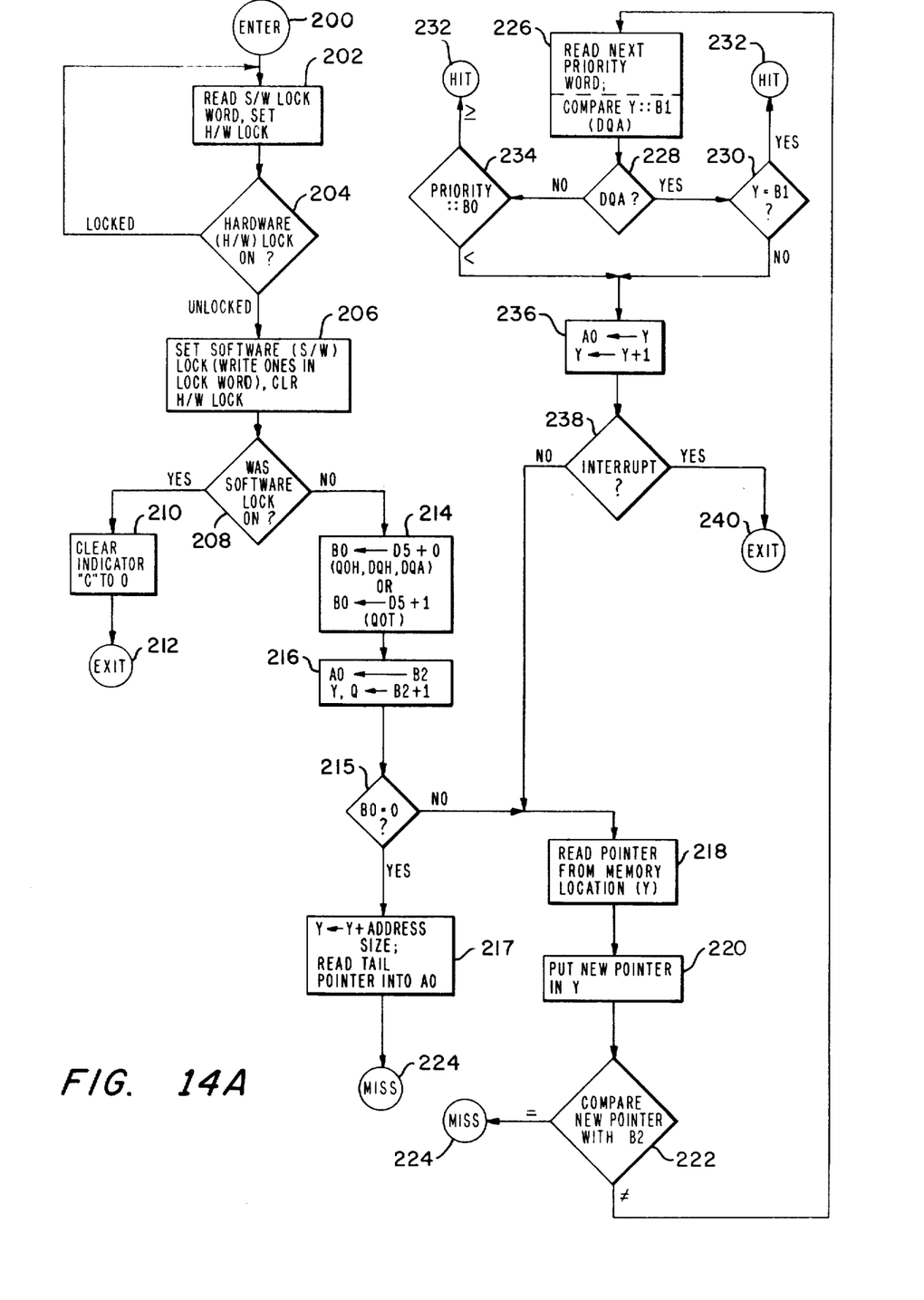
FIGS. 14A through 14D illustrate detailed flow diagrams of the operation of the present invention.

Now referring to FIG. 14A, the manner in which the QOH instruction operates and the firmware implementation thereof is shown. At block 200 the QOH instruction is entered following which the address in register B2 of the RALU 12, as more particularly shown in FIG. 2, is utilized to address the lock word, which in accordance with block 202 is read and the hardware lock is set. The hardware lock structure is specifically shown and described in U.S. Pat. No. 4,000,485, issued on Dec. 28, 1976, and entitled "DATA PROCESSING SYSTEM PROVIDING LOCKED OPERATION OF SHARED RESOURCES". After the operation of block 202 is performed, decision block 204 is entered at which point a decision is made as to whether the hardware lock was on prior to the execution of block 202. If the lock was on, then block 202 is reentered. If the hardware lock was off, the software lock is set by writing binary ONEs into the software lock word as shown in block 206. The interaction of the hardware and software locks is not relevant to the purpose of the present invention, but is used in the implementation illustrated to provide continuous protection of the queue structure in a multiple processor environment. At this point, the hardware lock is cleared. A test is then made as to whether the software lock was on prior to the operation of block 206, as shown in block 208. If the answer to decision block 208 is Yes, then the C-indicator is cleared to a binary ZERO as indicated in block 210, following which there is an exit from this process as indicated in block 212. The C-indicator is included in the I register 16 and is utilized to indicate whether or not the scan has been tried and completed, or whether it was unable to be completed. If the scan is completed, the C-indicator will be set to a binary ONE. If the software lock was not on, then block 214 is entered.

At this point, block 214 indicates that register B0 will, depending upon the instruction, be loaded with a certain value. If it is a QOH instruction, then the B0 will be loaded with the contents of D5, whereas if it is a QOT instruction, then B0 will be loaded with the value of D5 incremented by one. As has been indicated, register D5 contains the priority number and accordingly during the QOT instruction, this priority number is incremented by one before placing it into the B0 register. The B0 register is utilized as shall be discussed hereinafter.

Block 216 is then entered at which time the contents of register B2 are placed in register A0, which is another register which may be found in the microprocessor logic of FIG. 2. As will be recalled, register B2 contains the address of the lock word in the lock frame. This address is placed in register A0 in order to be able to manipulate such value as shall be seen, without disturbing the contents of register B2. Following this, the Y and Q registers are each loaded with the value of B2 incremented by one. In the next step, as shown in block 215, the question is answered as to whether or not the contents of register B0 are equal to ZERO. If the answer is Yes, then block 217 is entered by which the contents of the register are increased in value by the address size following which the tail pointer is placed in register A0. The miss operation is then entered as indicated by block 224. If however the answer to block 215 was a No, then in the next step as shown in block 218, the pointer is read from the memory location indicated by the Y register. This new pointer is then placed in the Y register as indicated in block 220. This memory is a memory which is coupled to the processor of FIG. 1 via the external bus as shown in U.S. Pat. No. 4,030,075, issued June 14, 1977.

The new pointer is then compared with a value in register B2 as indicated in block 222. If there is comparison, then this indicates a miss situation as indicated by block 224, which miss situation operates in accordance with the flow diagram in FIG. 14C. If there is no comparison, then block 226 is entered at which time the priority word of the next frame is read, following which the contents of the Y register are compared with the contents of the B1 register. This comparison is particularly applicable in the DQA instruction. Thus, the question is then asked as to whether or not this is a DQA instruction, as indicated in block 228. If it is, then the question is asked, as indicated in block 230, as to whether or not the contents of the Y register are equal to the contents of B1 register. If the answer is Yes, then there is a hit situation, as indicated by block 232, and, accordingly, the flow diagram of FIG. 14B is entered. If the answer to block 230 is No, then block 236 is entered, as shall be hereinafter described. If the answer to block 228 was No, i.e., this is not a DQA instruction, then block 234 is entered at which time the value of the priority word is compared with the contents of register B0. If such comparison produces an equal or greater than indication, the hit situation is indicated and the operation of FIG. 14B proceeds. If such comparison indicates a less than situation, that is the value of the priority word is less than the value of the contents of register B0, then block 236 is entered. At this time, the contents of the Y address register are placed in the A0 register, following which the Y register is incremented by one. The determination of whether there is an interrupt situation is then made as indicated in block 238. If there is an interrupt situation, then the operation of FIG. 14A is exited, as indicated by block 240, at which time the operation of FIG. 14D proceeds. If there is no interrupt, then, in fact, block 218 is entered again wherein a pointer is read from the memory location indicated by register Y, which, as indicated by block 236, has been incremented by one.

Figure 14B:
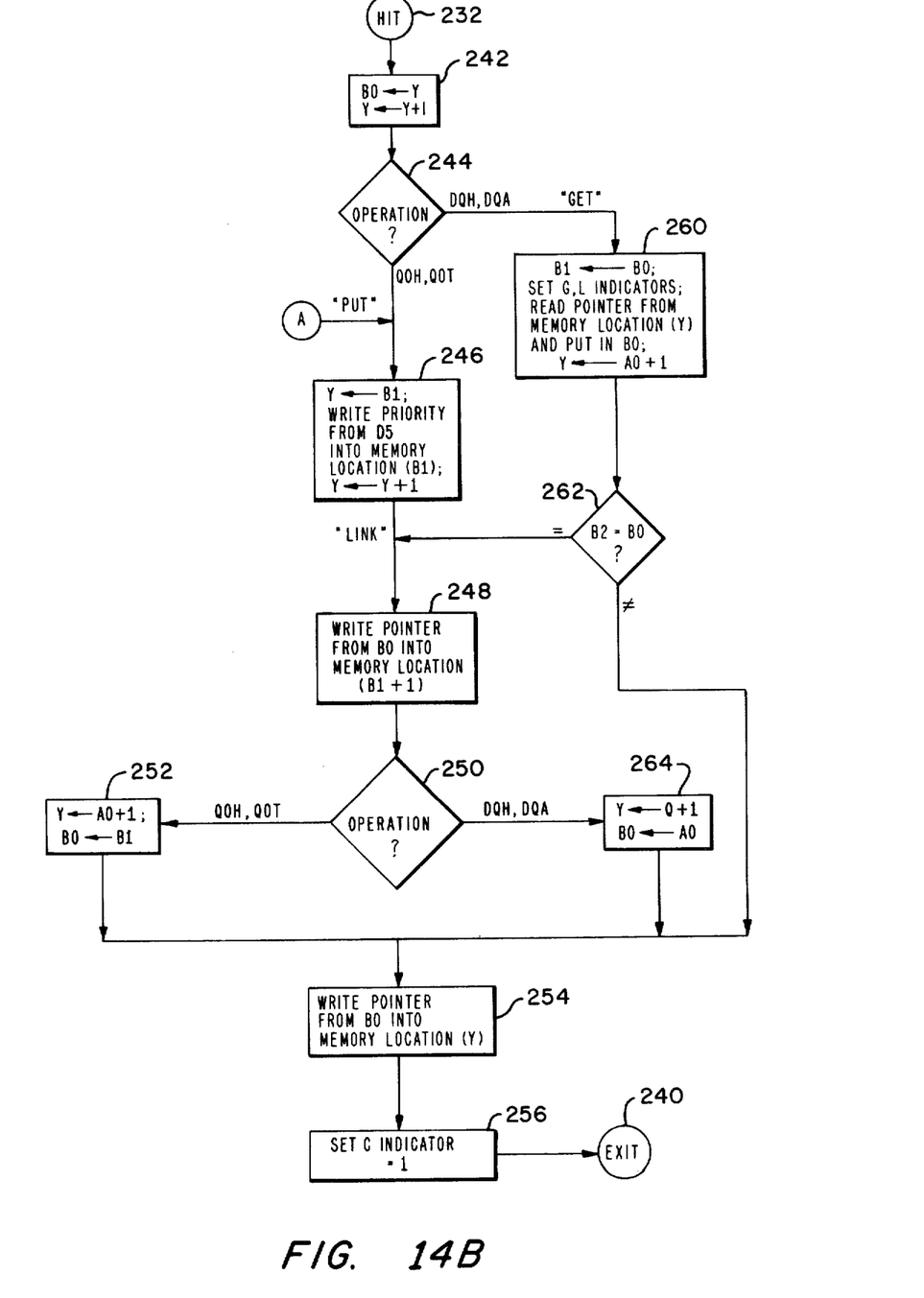

Now referring to FIG. 14B, the situation wherein a hit situation is encountered, as indicated in FIG. 14A, shall be described. Initially block 242 is entered, at which time the contents of the Y register are placed in register B0 and the Y register is incremented by one, following which there is a requirement that the nature of the operation, i.e., the instruction, must be determined as indicated by the decision block 244. If this is a QOH or QOT instruction, then block 246 is entered. It is herein noted that block 246 has another input which is received from FIG. 14C during the miss operation. Thus, when block 246 is entered the contents of register B1 are placed in the Y register, following which the priority word is written from register D5 into the memory location indicated by register B1, following which the Y register is incremented by one. Block 248 is then entered, at which time the pointer is written from register B0 into the memory location addressed by the value in register B1 incremented by one. The instruction being operated upon is then queried, as indicated by block 250, and if it is a QOH or QOT instruction, block 252 is entered at which time the contents of the A0 register are incremented by one and placed in the Y register. The contents of register B1 are then placed in register B0. Block 254 is then entered at which time the pointer is written from register B0 into the memory location addressed by register Y. The C-indicator of the I register is then set to a binary ONE as indicated by block 256, which, as indicated hereinbefore, indicates that the scan has been completed. Following this, the operation of FIG. 14B is exited as indicated by block 240. The operation then continues as indicated in FIG. 14D.

The preceding paragraph has described the operation wherein the instruction has been a QOH or QOT instruction. If the operation is a DQH instruction or a DQA instruction, then the initial decision block with respect thereto, i.e., block 244, branches to the operation indicated in block 260. At this time the contents of register B0 are placed in register B1 and and G and L indicators are set in order to, for example, indicate whether the frame was unlinked or whether no match was found, or whether the unlinked frame was the first whose priority equalled the contents of register D5, or whether the unlinked frame was the first whose priority exceeded the value in register D5. Following this, the pointer is read from the memory location indicated by the Y register and is placed in register B0. The contents of the A0 register, incremented by one, are placed in register Y. Following the operation of block 260, as indicated in block 262, the question is asked as to whether the contents of register B0 are equal to the contents of register B2. Thus, the value of the pointer, which is read from the memory location pointed to by the Y register, is compared with the address of the lock word in the lock frame. If they are equal, then the operation of block 248 is followed, but if not equal, the operation of block 254 is followed. If there was an equal comparison, as indicated by block 262 and this was a DQH or a DQA instruction, then block 250 will branch to block 264 by which the contents of the Q register incremented by one are placed in the Y register, following which the A0 register contents will be placed in the B0 register. Following this operation, the operation indicated by block 254 is entered.

Having described a situation as indicated in FIG. 14B wherein a so-called hit occurs, FIG. 14C will now be described for that situation in which a so-called miss occurs as indicated by block 224. Following the entry into this miss operation, block 270 is entered by which the C-indicator is set to a binary ONE. As indicated hereinbefore, the fact that the C-indicator is set to a binary ONE means that the scan has been tried and that the instruction need not be done again. Thus, the operation for that instruction is complete at least for the present time. Following this, the question is then asked in block 272 as to which operation this is. If it is an QOH or QOT instruction, then block 274 is entered at which time the value in the Q register plus the address size (e.g., one or two words) is used to address the tail pointer, following which the contents of the B1 register are written into the tail pointer. Following this, the contents of the B2 register are placed in register B0. At this point, junction A is entered, which junction or point A may be seen as an entry point to block 246 in FIG. 14B. The operation then continues as indicated in block 246. If this were a DQH or DQA instruction, as indicated by block 272, then block 276 is entered at which time the G and L indicators are set appropriately. Finally, the operation exits as indicated by block 240.

Figures 14C, 14D:
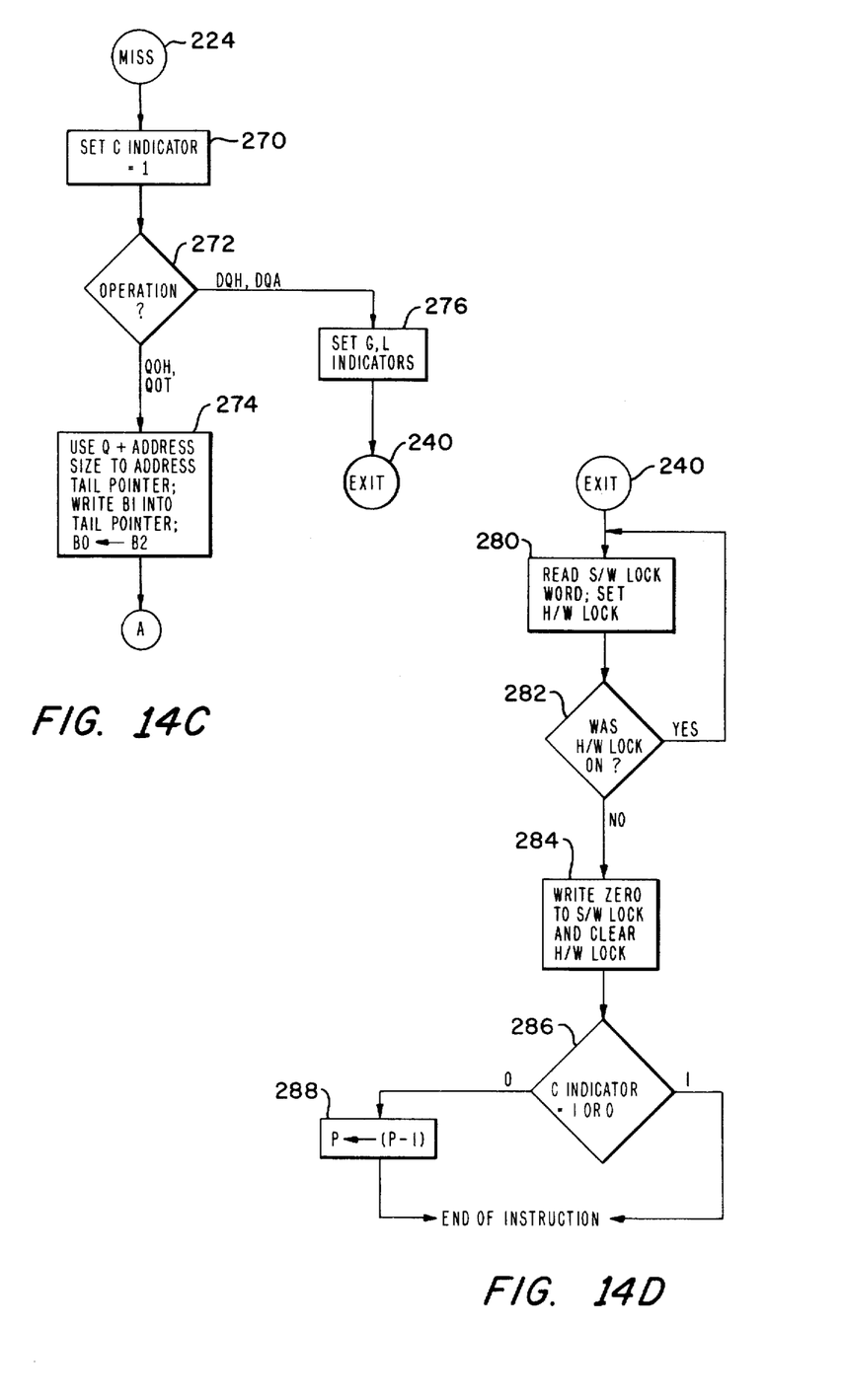

Now referring to FIG. 14D, the manner in which each of such operations exits, as indicated by block 240, shall be discussed. At block 280, the software lock is read and the hardware lock is set. The question is then asked, as indicated in block 282, as to whether or not the hardware lock was on, prior to the setting action indicated in block 280. If the hardware lock was on, as indicated by a Yes answer to block 282, then block 280 is reentered. If the hardware lock was off, as indicated by a No answer, block 284 is entered whereby binary ZEROs are written into the software lock word and the hardware lock is cleared. The question is then asked, as indicated in block 286, as to whether or not the C-indicator equals a binary ONE or ZERO. If C is equal to a ONE, this means that this is the end of the instruction. If C is equal to a ZERO, this indicates the need for decrementing the program counter by one, as indicated in block 288, following which the instruction is also indicated to end.

The manner in which the four generic operations of the queue structure of the present invention operate, has been seen. Use of a lock frame including the lock word therein has also been seen. As has been shown, this lock word, sometimes referred to as the software lock, is checked when starting the operation of any of the four generic instructions, and at such time the lock word is locked, by setting to the appropriate binary value.

However, if it had already been locked, the instruction is exited and is not reentered until the lock word is unlocked, since in fact, by indicating that the lock word is locked, this means that there is another operation being performed with respect to the coupled queue structure, which operation should not be disturbed. When the operation is completed, the lock word is unlocked. Thus, the queue structure is locked, i.e., the lock word indicates that the queue structure should not be disturbed, and is so locked during the scan operation and as the various pointers in the frames are being swapped and/or updated. In general, the hardware lock previously referred to is set and is then unset (the hardware lock is not set during the scan operation) so as to insure that no more than one process being executed in the data processing system may check the software lock at any given time, thereby avoiding an incorrect answer as to the status of the lock word in the lock frame. There may be more than one software lock for each hardware lock, i.e., there may be more than one threaded list of frames with each having a lock frame and included lock word. By use of such lock words, synchronization for multiprocessing units is provided.

Having described the invention, what is claimed as new and novel and for which it is desired to secure Letters Patent is:

1. In a data processing system including a processor for executing microinstructions to perform selected operations on data, a queuing system for the data and operations comprising:
   data storage means coupled to said processor and including a list of data storage frames for temporarily storing queuing information describing the location and priority of data received by said data processor, said queuing information being stored in said data storage means in said list of data storage frames, the first frame in said list being a lock frame for controlling access to said list when another operation is being performed on said list, and the remaining frames in said list being priority frames associated with said lock frame, each of said priority frames corresponding to an element of data to be operated upon by said processor, each of said priority frames including:
   an addressable data storage location for storing a priority number assigned by said processor for indicating the relative priority of said priority frame;
   an addressable data storage location for storing a pointer including address information for locating another of said priority frames; and
   an addressable data storage location for storing information corresponding to said priority frame; said lock frame including:
   an addressable data storage location for storing a control word associated with said list for indicating whether said associated list can be accessed by said processor:
   an addressable data storage location for storing a first frame pointer including address information for locating the first of said priority frames in said associated list; and
   an addressable data storage location for storing a last frame pointer including address information for locating the last of said priority frames in said associated list;
said queuing system further comprising:
   control store means coupled to said processor for storing said microinstructions and for selectively supplying said stored microinstructions to said processor, said control store including:
   first means for controlling said processor to selectively access the contents of said lock frame;
   second means for controlling said processor responsive to the contents of said accessed lock frame to enable access by said processor to said list of priority frames associated with said accessed lock frame;
   third means for controlling said processor responsive to the receipt of additional data and to said priority numbers included in said accessed priority frames for inserting additional priority frames corresponding to said additional data into said list in a relative position determined by the priority of said received data; and
   fourth means for controlling said processor to retrieve selectively any one of said priority frames from said list on the basis of either the priority number of said frame to be retrieved or to the address of said frame to be retrieved.

2. The queuing system of claim 1 wherein said third controlling means includes first inserting means for controlling said processor to place the address of the first of said priority frames in said first frame pointer location; second inserting means for controlling said processor to place the address of each other of said priority frames into the pointer location of the next preceding priority frame; and third inserting means for controlling said processor to place the address of said lock frame into the pointer location of said last priority frame.

3. The queuing system of claim 2 wherein said means for inserting also includes fourth inserting means for controlling said processor to place the address of said last priority frame into said last frame pointer location.

4. The queuing system of claim 3 wherein said information contained in said priority frames includes data to be processed by said processor.

5. The queuing system of claim 3 wherein said address information stored in said priority frames includes address information for locating additional data corresponding to said priority frame to be processed by said processor.

6. The queuing system of claim 1 wherein said priority frames included in said list are maintained in a sequence based upon ascending priority number and wherein said third controlling means includes first frame inserting means for controlling said processor to place a said additional priority frame in said list just before the first of said priority frames which has a priority number equal to or greater than the priority number stored in said additional priority frame.

7. The queuing system of claim 6 wherein said third controlling means also includes second frame inserting means for controlling said processor to place a said additional priority frame in said list just after the last priority frame in said list which has a priority number equal to or less than the priority number stored in said additional priority frame.

8. The queuing system of claim 1 wherein said fourth controlling means includes means responsive to an instruction from said processor for indicating the priority number of a priority frame to be retrieved from said list; and fifth means responsive to said indicating means for controlling said processor to recover a priority frame in said list having the indicated priority number.

9. The queuing system of claim 8 wherein said recovering means includes sixth means for controlling said processor to fetch the priority frame having the closest next higher priority number when no priority frame having the indicated priority number is present.

10. In a data processing system including a processor for executing microinstructions to perform selected operations on data, a method of queuing the data and operations comprising the steps of:
providing a data storage means coupled to said processor and including a plurality of addressable data storage locations;
establishing in said data storage locations of said data storage means a list of storage frames including a series of priority frames for temporarily storing queuing information describing the location and priority of data received by said data processor;
creating in said first frame of said list an associated lock frame for controlling access to said list;
storing in a first addressable data storage location in said lock frame a control word associated with said list for indicating whether said list can be accessed by said processor;
storing in a second data storage location in said lock frame a first frame pointer including address information for locating the first of said priority frames in said list;
storing in a third data storage location in said lock frame a last frame pointer including an address for locating the last of said priority frames in said list;
storing in a first addressable frame data storage location in each of said priority frames a priority number assigned by said processor to indicate the relative priority of each of said priority frames;
storing in a second addressable frame data storage location of each of said priority frames a pointer including an address for locating another of said priority frames;
storing in a third addressable frame data storage location of each of said priority frames said data corresponding to said priority frame;
controlling said processor to access selectively the contents of said lock frame;
controlling said processor responsive to the contents of said accessed lock frame to access said priority frames associated with said accessed locked frame;
controlling said processor responsive to the receipt of additional data and to said priority numbers included in said accessed priority frames to insert at least one additional priority frame corresponding to said additional data into said list in a relative position determined by the priority of said received data; and
controlling said processor to retrieve selectively any one of said priority frames from said list on the basis of either the priority number of said frame to be retrieved or to the address of said frame to be retrieved.

* * * * *